United States Patent
Chopra et al.

(10) Patent No.: US 12,135,615 B2
(45) Date of Patent: Nov. 5, 2024

(54) DYNAMIC SLICING OF FILESYSTEM DATA WITH APPLICATION AWARENESS

(71) Applicant: Dell Products L.P., Round Rock, TX (US)

(72) Inventors: Shelesh Chopra, Bangalore (IN); Upanshu Singhal, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 4 days.

(21) Appl. No.: 18/082,688

(22) Filed: Dec. 16, 2022

(65) Prior Publication Data
US 2024/0202075 A1 Jun. 20, 2024

(51) Int. Cl.
*G06F 11/14* (2006.01)
*G06F 16/11* (2019.01)

(52) U.S. Cl.
CPC ........ *G06F 11/1451* (2013.01); *G06F 16/122* (2019.01); *G06F 2201/84* (2013.01)

(58) Field of Classification Search
CPC . G06F 11/1451; G06F 16/122; G06F 2201/84
USPC ......................................................... 707/646
See application file for complete search history.

(56) References Cited

U.S. PATENT DOCUMENTS

2022/0121528 A1* 4/2022 Brenner ................ G06F 3/0656

* cited by examiner

*Primary Examiner* — Hosain T Alam
*Assistant Examiner* — Nicholas E Allen
(74) *Attorney, Agent, or Firm* — Chamberlain, Hrdlicka, White, Williams & Aughtry; Aly Dossa

(57) ABSTRACT

Embodiments of the invention relate to methods and systems for efficiently backing up a production host. In one or more embodiments, the size of slices associated with certain preset asset types are altered. By leveraging metadata of previous backups performed on the assets/hosts, one or more embodiments of the invention are able to determine the types of assets being backed up. Based on these determinations, some asset types may be assigned to slices having a larger size, while other assets may be assigned to slices having smaller sizes as appropriate for type of asset. Thus, various embodiments may improve the utilization of system and network resources.

11 Claims, 5 Drawing Sheets

DYNAMIC SLICING OF FILESYSTEM DATA WITH APPLICATION AWARENESS

BACKGROUND

As people increasingly rely on computing systems and devices to perform a plethora of tasks; the systems have become increasingly complex, and the opportunities for failure and/or loss of important data has also increased. In order to avoid loss of important data, backups are performed on the computing systems and devices, so that when device failures or loss of data for other reasons occur, the lost data may be restored. However, traditional methods of backing up and restoring data is inefficient, slow, and uses much of the available network bandwidth.

SUMMARY

In general, certain embodiments described herein relate to a method for performing an incremental backup of selected assets. The selected assets are stored in a file-system associated with a production host. The method comprises receiving a request to perform the incremental backup of the selected assets, and retrieving, in response to the request, backup metadata from a previous backup of the selected assets. Based on the backup metadata, an asset type is determined for each type of the selected assets and the asset types are stored in a list of asset types. Once the list of asset types is generated, each asset is placed in at least one slice to generate a slice list. The at least one slice has a size that is changed from a standard size, if the asset type of the asset is a preset type. Once the slice list is made, the incremental backup of the selected assets is performed using the slice list.

In general, certain embodiments described herein relate to a non-transitory computer readable medium comprising computer readable program code, which when executed by a computer processor enables the computer processor to perform a method for performing an incremental backup of selected assets. The selected assets are stored in a file-system associated with a production host. The method comprises receiving a request to perform the incremental backup of the selected assets, and retrieving, in response to the request, backup metadata from a previous backup of the selected assets. Based on the backup metadata, an asset type is determined for each type of the selected assets and the asset types are stored in a list of asset types. Once the list of asset types is generated, each asset is placed in at least one slice to generate a slice list. The at least one slice has a size that is changed from a standard size, if the asset type of the asset is a preset type. Once the slice list is made, the incremental backup of the selected assets is performed using the slice list.

In general, certain embodiments described herein relate to a system comprising: at least one production host, at least one processor, and a memory. The memory includes instructions, which when executed by the processor, perform a method for performing an incremental backup of the at least one production host. The method comprises receiving a request to perform the incremental backup of the at least one production host, and retrieving, in response to the request, backup metadata from a previous backup of the at least one production host. Based on the backup metadata, an asset type is determined for each type of asset stored in a file-system of the at least production host and the asset types are stored in a list of asset types. Once the list of asset types is generated, each asset is placed in at least one slice to generate a slice list. The at least one slice has a size that is changed from a standard size, if the asset type of the asset is a preset type. Once the slice list is made, the incremental backup of the at least production host is performed using the slice list.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
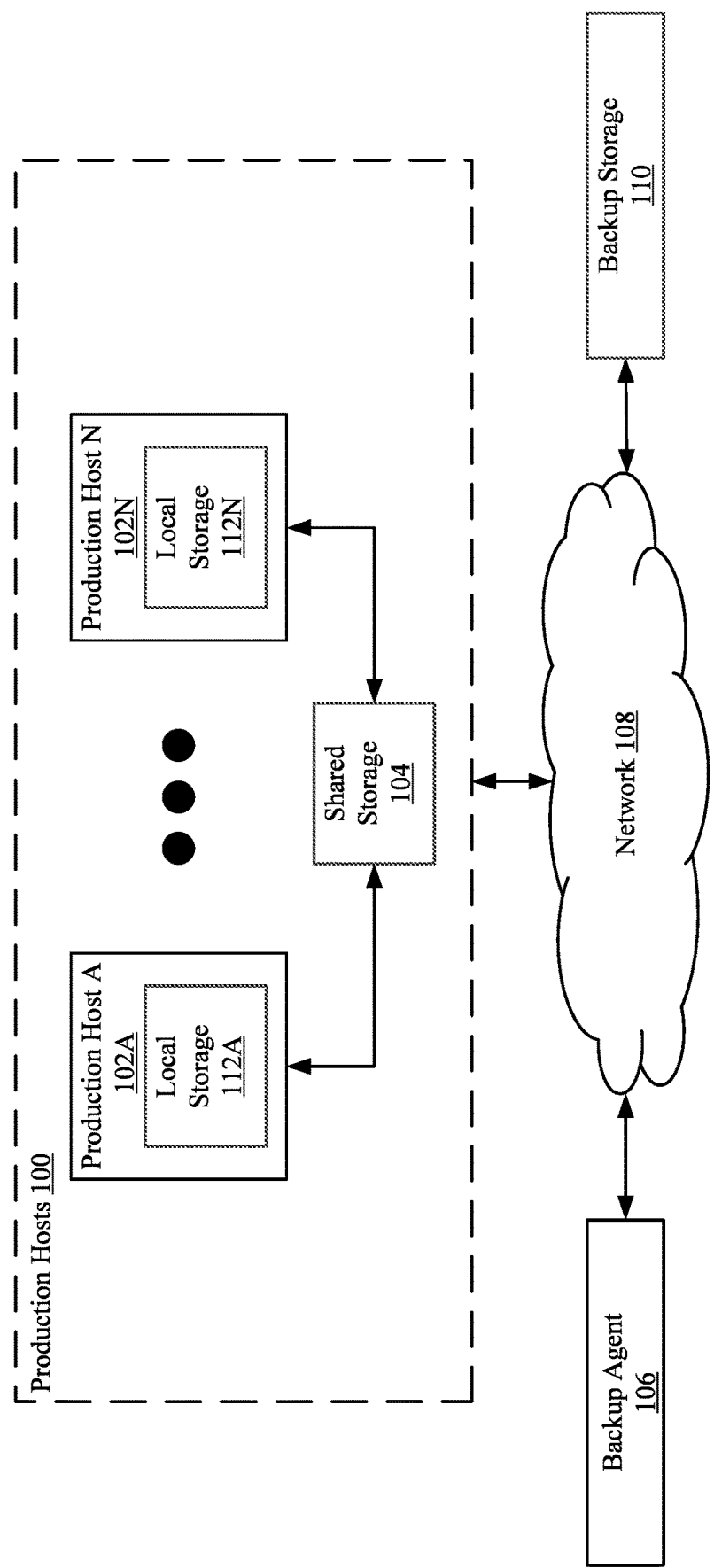
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology.

Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, backups are inefficiently performed. Clients send a request for backing up desired assets such as files, folder, and/or data stored in a host or in other locations such as shared storage. When the request is received the host and the client crawl the files and/or folders over the network to get a list of the assets associated with the backup request. Once the assets are determined, they are sliced to form manageable slices which are assigned to a plurality of network streams.

Currently, however, there is no intelligence for altering the sizes of the slices to better accommodate diverse types of assets such as databases and virtual hard disks. For some types of assets, the traditional slice size may be too small to accommodate the files, resulting in the files being stored across multiple slices. For other types of assets, a traditional slice size may be too large and result in inefficient uses of slicing and network resources. The resulting backups are performed with low parallelism and therefore do not efficiently utilize all available resources, resulting in reduced backup and recovery performance.

In order to overcome these and other shortcomings of the traditional data protection and management solutions, one or more embodiments of the invention alter the size of slices (which may be expressed in terms of bytes or number of files) associated with certain preset asset types. By leveraging metadata of previous backups performed on the assets/hosts, one or more embodiments of the invention are able to determine the types of assets being backed up. Based on these determination some asset types may be assigned to slices having a larger size, while other assets may be assigned to slices having smaller sizes as appropriate for the type of asset. This results in better utilization of system and network resources as well as a better backup and recovery performance.

The following describes various embodiments of the invention.

FIG. 1A shows a diagram of a system in accordance with one or more embodiments of the invention. The system includes a group of production hosts (100). The group may include a plurality of production hosts (102A-102N) as well as any shared storage (104). The system may include any number of hosts (e.g., 102A-102N) and while shown as one group of two hosts (102A and 102N), there may be any number hosts and the hosts may belong to any number of groups or being interrelated in any manner without departing from the invention. For example, the system may include six hosts configured as two groups (not shown) that communicate through a network (108).

The system also includes a backup agent (106) which may perform backups of assets located on any of the production hosts (e.g., 102A-102N) and/or the shared storage (e.g., 104). The system may also include backup storage (110) for storing any number of backups. Both the backup agent (106) and backup storage (110) may be part of the same device including one or more production hosts (e.g., 102A-102N) or may be separate standalone systems. The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the production hosts (100) interact, via a network (108), with one or more backup agents (e.g., 106). The backup agent (106) may be a separate computing system that coordinates backups and restorations and either includes or communicates with a backup storage (e.g., 110) for storing a completed backup and other data. Alternatively, or in addition to, in one or more embodiments of the invention, the backup agent may be part of any of the production hosts (e.g., 102A-102N) or other components of the production hosts (100) or the system. Other configurations of the backup agent (e.g., 106) and the production hosts (100) may be utilized without departing from the invention.

In one or more embodiments of the invention, the backup agent (106) may generate and provide to the backup storage device (110) backup data, backup metadata, as well as any other data that is produced by the backup agent (106) in the process of performing a backup based on backup policies implemented by the backup agent (106). The backup policies may specify a schedule in which assets associated with the production hosts (e.g., 102A-102N) are to be backed up. The backups may take the form of either a full or incremental backup as well as any other type of backup.

The backup agent (106) may be triggered to generate a backup along with backup metadata and provide the backup and its metadata to the backup storage device (110) in response to a backup policy. Alternatively, backup, and backup metadata may be generated by the backup agent (106) and provided to the backup storage device (110) in response to a backup request triggered by a client (not-shown) or user of the system. The method of backing up an asset comprising of files and folders is described in more detail below with regards to the methods shown in FIGS. 2 and 3.

In one or more embodiments of the invention, the backup agent (106) may restore the backup metadata and backup data stored in the backup storage (110). When the backup agent (106) or other equivalent component of the system, receives a request for a restoration of a backup, the backup agent (106) or equivalent component, retrieves the metadata and data stored in the backup storage (e.g., 110) and restores the data to its original location in the production hosts (e.g., 102A-102N). Alternatively, in one or more embodiments of the invention, the data in the backup may be restored to a file-system located in a different production host than where it was originally restored as directed by a user, administrator, or other party that requested the restoration.

In one or more embodiments of the invention, the backup agent (106) stores backup data on backup storage (e.g., 110). The backup storage (110) may store data and/or files such as backup data, metadata, as well as definitions rules, procedures, and other pertinent information for performing backups of the production hosts (e.g., 102A-102N). The backup storage (110) may include one or more processors, memory (e.g., random access memory), and persistent storage (e.g., disk drives, solid state drives, etc.). In one or more embodiments of the invention, the backup storage (110), as well as the backup agent (106) itself, may also, or alternatively, comprise of off-site storage including but not limited to, a cloud base storage, and long-term storage such as tape drives, depending on the particular needs of the user and/or the system.

In one or more embodiments of the invention, the backup agent (106) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (106) described throughout this application.

Figure 4:
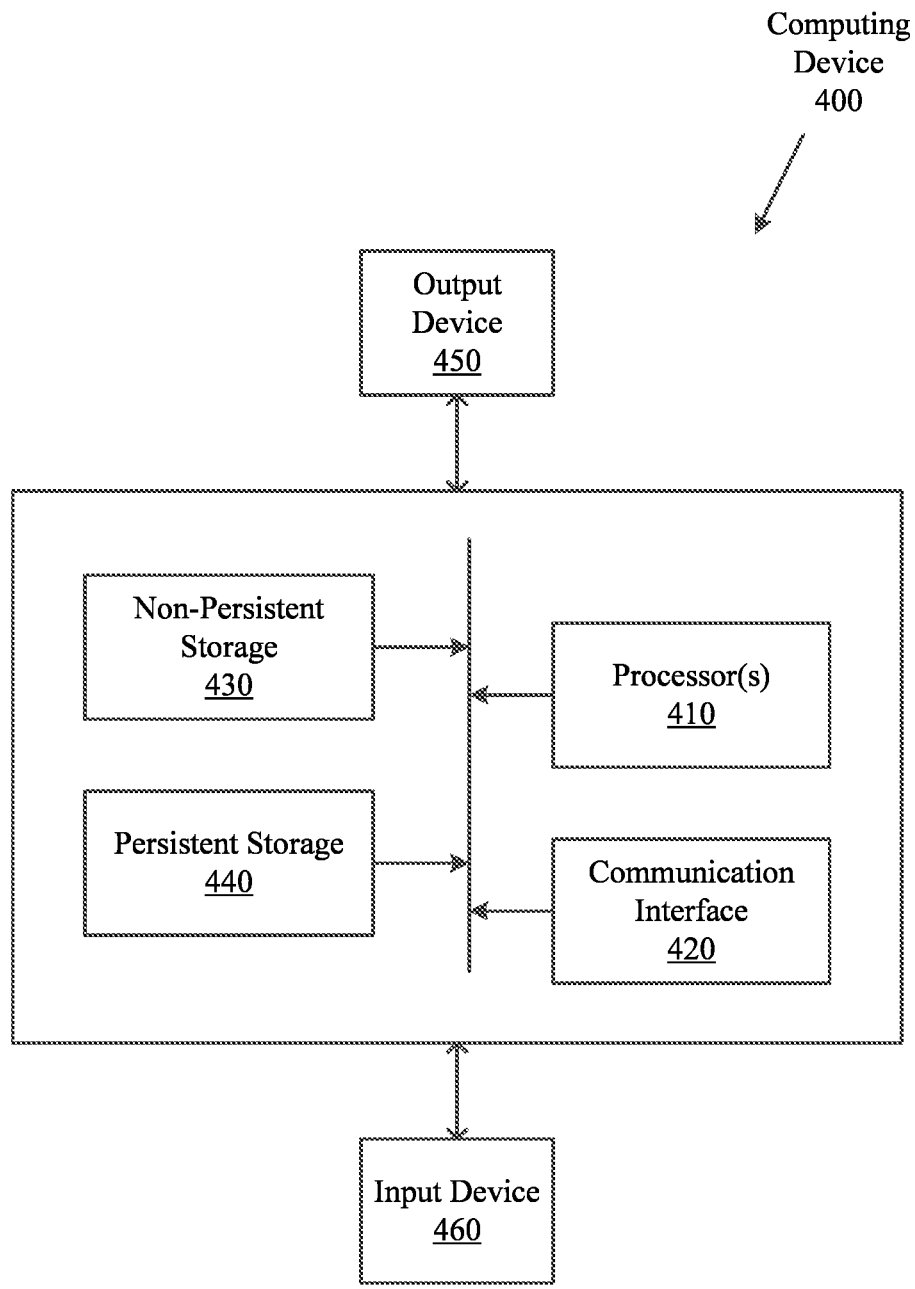
FIG. 4 shows a diagram of a computing device in accordance with one or more embodiments of the invention.

In one or more embodiments of the invention, the backup agent (106) is implemented as a computing device (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup agent (e.g., 106) described throughout this application.

In one or more embodiments of the invention, the backup agent (106) is implemented as computer instructions (e.g., computer code) stored in a persistent storage that when executed by a processor of the production hosts (e.g., 102A-102N) causes the production hosts (e.g., 102A-102N) to provide the functionality of the backup agents (e.g., 106) described throughout this application. Alternatively, in one or more embodiments of the invention, the backup agent (106) may be implemented by a client (not shown), or other component of the system, which may provide the functionality of the backup agent (106) described throughout this application.

In one or more embodiments of the invention, the production hosts (100) shared storage (104), the backup agent (106), and backup storage (110) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the production hosts (100) to communicate with other production hosts and other external computing devices such as, but not limited to, a client and/or a backup agent (e.g., 106). The production hosts (100) may also communicate with each other through a network. The network may be a high-speed internal network and/or include part of an external network (e.g., 108). The production hosts (100), and shared storage (104) communicate with each other over the internal network and in one or more embodiments of the invention provide fallback functionality.

A network (e.g., 108) may refer to an entire network or any portion thereof (e.g., a logical portion of the devices within a topology of devices). A network (e.g., 108) may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with, or overlap, at least in part, with the Internet.

In one or more embodiments, although shown separately in FIG. 1A, the network (108) may include any number of devices within any components (e.g., 100, 102A-102N, 104, 106, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown). A network device may also include one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an Infini-Band® device, etc. A network device is not limited to the aforementioned specific examples.

In one or more embodiments of the invention, the network (e.g., 108) utilizes one or more streams for communicating (or transferring) information between two components such as between the production hosts (e.g., 102A-102N) and the backup agent (e.g., 106). Any particular communication may have one or more streams assigned to it, with a maximum number of streams being preconfigured as a consequence of the network's design. Each stream has a maximum throughput, which is the maximum amount of data that may be sent between two components during a period of time given network conditions. The total number of streams that may be used is dependent on the capabilities of the network and components as well as the total throughput. Each stream utilizes part of the total bandwidth, thus when more streams are applied, each stream has a lower total throughput.

One or more embodiments of the invention, includes a plurality of production hosts (e.g., 102A-102N) which include the functionality to obtain data protection services from a data protection manager (not shown) or the backup agent (e.g., 106). While shown as including only three production hosts (e.g., 102A-102N), the production hosts (100) may include more or less production hosts without departing from the invention. For example, a group of production hosts (e.g., 100) may include at least sixteen production hosts, at least fifty production hosts, or at least a hundred production hosts without departing from the invention.

Each host (e.g., 102A-102N) includes local storage (e.g., 112A-112N) for storing assets such as files and folders which may be made available to other hosts or requesting target devices such as the backup agent (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may communicate or utilize off-site storage including, but not limited to, shared storage (104), cloud base storage, and long-term storage such as tape drives, depending on the particular needs of the user and/or the system.

The production hosts (100) may utilize shared storage (104), e.g., a network attached storage array (NAS). Other types of shared storage may also or alternatively be included such as active-passive storage and other kinds of shared storage. The shared storage may communicate with each of the production hosts by high-speed network or other dedicated communication means. In one or more embodiments of the invention the shared storage may be used instead of the local storage (e.g., 112A-112N) or may be used in concert with the local storage (e.g., 112A-112N). The share storage may also be used as the backup storage (e.g., 110).

The local storages (e.g., 112A-112N) and/or shared storage (e.g., 104) may include any number of storage volumes without departing from the invention. The storage volumes may be physical storage devices and/or logical storage devices. The physical storage devices may include any combination of hard disk drives, solid state disk drives, tape drives, and/or any other physical storage mediums for data.

The logical storage devices may utilize any quantity of hardware storage resources of any number of computing devices for storing data. For example, the local and shared storages (e.g., 112A-112N, 104) may utilize portions of any combination of hard disk drives, solid state disk drives, tape drives, and/or any other physical storage mediums for any number of computing devices.

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients, not shown). The computer implemented services may include, for example, database services, electronic mail services, data processing services, etc. The computer implemented services may include other and/or additional types of services without departing from the invention.

During the performance of the services described above, data may be generated and/or otherwise may be obtained. The various data storage volumes (e.g., 112A-112N and 104) may be used during the performance of the services described above, by performing data storage services including storing, modifying, obtaining, and/or deleting data. The data storage services may include other additional services without departing from the invention.

The data generated and stored on the local storages (e.g., 112A-112N) and shared storage (e.g., 104) by the production hosts (e.g., 102A-102N) may be valuable to users of the system, and therefore may be protected by the backup agent (e.g., 106). The production hosts (e.g., 102A-102N), alternatively or in addition to the backup agent (e.g., 106) may provide backup storage services and include backup storage on the local storage (e.g., 112A-112N) and/or shared storage (e.g., 104). The backup storage services may include storing backups of data stored on the shared storages for restoration purposes. The backup storage services may include other and/or additional services without departing from the invention.

The production hosts (e.g., 102A-102N) may include a primary production host (e.g., 102A) and secondary production hosts (e.g., 102N). The specific configuration of which production host is the primary production host and which production host is the secondary production host may be preconfigured or may be automatically managed by a system manager (not shown). The production hosts (e.g., 102A-102N) may include any number of secondary production hosts without departing from the invention. Alternatively, all production hosts (e.g., 102A-102N) may be secondary production hosts with another component of the system or external computing component performing the additional tasks of the primary host.

In one or more embodiments of the invention, the production hosts (e.g., 102A-102N) are implemented as computing devices (see e.g., FIG. 4). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (e.g., 102A-102N) described throughout this application.

In one or more embodiments of the invention, the production hosts (e.g., 102A-102N) are implemented as logical devices. The logical devices may utilize the computing resources of any number of computing devices and thereby provide the functionality of the production hosts (e.g., 102A-102N) described throughout this application.

Figure 1B:
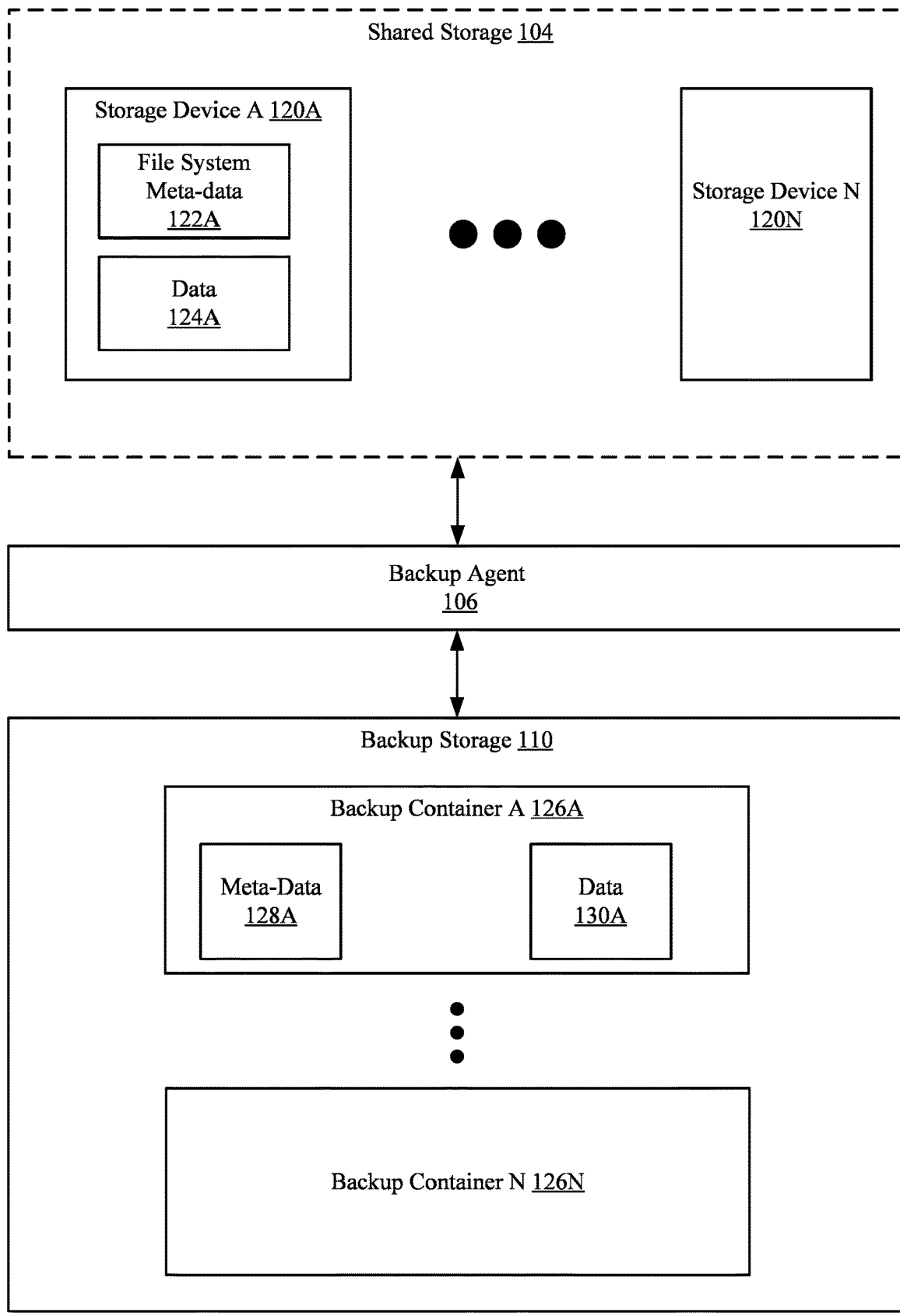
FIG. 1B shows a detailed diagram of a system for backing up and restoring a production host in accordance with one or more embodiments of the invention.

Turning now to FIG. 1B, FIG. 1B shows a diagram of specific components utilized in performing a backup of a user defined logical asset located on the shared storage (104) and/or at least one production host (e.g., 102) by a backup agent (e.g., 106) in accordance with one or more embodiments of the invention. The shared storage (e.g., 104) communicates with one or more backup agents (e.g., 106) and related backup storage (e.g., 110). Each component illustrated in FIG. 1B is discussed below.

The shared storage (e.g., 104) may be similar to the shared storage (e.g., 104) as discussed above in reference to FIG. 1A. The shared storage (e.g., 104) can be in the form of a NAS array and/or other types of shared storage. The shared storage (e.g., 104) may include additional, fewer, and/or different components without departing from scope of the invention. Each component may be operably connected to any of the other components via any combination of wired and/or wireless connections.

The shared storage (e.g., 104) includes storage devices, (e.g., 120A-120N). The storage devices (120A-120N) may be in the form of the local storage devices (e.g., 112A-112N, FIG. 1A) on a NAS array or a combination of both local and remote storage devices. The storage devices, (e.g., 120A and 120N) may alternatively or in addition include storage devices located in the production hosts (e.g., 100, FIG. 1A) and/or remotely from the shared storage (104) and/or production host (e.g., 100, FIG. 1A) such as, but not limited to, cloud and edge storage, and other forms of external storage.

The storage devices (e.g., 120A-120N) may include a file system metadata repository (e.g., 122A) and data (e.g., 124A). A file system metadata repository (e.g., 122A) may be one or more data structures that includes information regarding application data stored in the file system repository. The information included in the file system metadata repository (e.g., 122A) in one or more embodiments of the invention may be determined as a normal function of the file system in each storage device (e.g., 120A-120N). This information may also be determined as part of a metadata-based backup (MBB), or other functions requested by the backup agent (e.g., 106) or other components of the system.

The information included in the file system metadata repository (e.g., 122A) in one or more embodiments of the invention may be used for determining the files and folders that are associated with an asset, producing estimates of the size of files and folders associated with the asset and/or other functions such as performing a backup as will be described in more detail with regards to the methods shown in FIGS. 2 and 3. The file system metadata repository (e.g., 122AN) may include additional information without departing from the invention.

The storage devices (e.g., 120A-120N), may include one or more data structures (e.g., 124A) that may include the actual data associated with one or more applications or assets. The storage devices (e.g., 120A-120N) may include data (e.g., 124A) generated by the production hosts (e.g., 100, FIG. 1A). The data may be any type of data such as, but not limited to, database data and email data generated by applications and/or their users. Each storage device (e.g., 120A-120N) may include any number of applications and associated data as well as assets not associated with a specific application such as user defined logical assets. In one or more embodiments of the invention, the data (e.g., 124A-124N) is in the form of files and folders and each asset comprises of files and folders that are either related to a specific application, are stand alone, or are related to a specific criteria defined by a user or administrator at the time that a backup is requested.

Users (e.g., individuals, administrators, or their proxies) operating or using the system, may use the data (e.g., 124A), stored on the storage devices (e.g., 120A-120N), when obtaining computer implemented services from the production hosts (e.g., 100, FIG. 1A). Additionally, the data (e.g., 124A), stored on the storage devices (e.g., 120A-120N) of the shared storage (102), may be obtained by a backup agent (e.g., 106) or other requesting device (not shown) to perform functions. The data (e.g., 124A) of the storage devices (e.g., 120A-120N), may be used by other and/or additional entities for other and/or additional purposes without departing from the invention.

In one or more embodiments of the invention, the backup agent (e.g., 106) as described in more detail above with regards to FIG. 1A, receives a request for a backup and requests the asset from the shared storage device (104) or a production host (e.g., 102A-102N, FIG. 1A) or through an intermediary such as the network (e.g., 108). The backup agent (e.g., 106) is associated with backup storage (e.g., 110) for storing the backup data (e.g., 130A) and associated metadata for the backup (e.g., 128A). In one or more embodiments of the invention, the backup storage (e.g., 110) stores the backup data (e.g., 130A) in a plurality of containers (e.g., 126A-126N).

The backup agent (e.g., 106) may take the form of a physical device that may include circuitry. The physical device may be, for example, a field-programmable gate array, application specific integrated circuit, programmable processor, microcontroller, digital signal processor, or other hardware processor. The physical device may be adapted to provide the functionality of the backup agent (e.g., 106) as described throughout this application. In one or more embodiments of the invention, the backup agent (e.g., 106) is implemented as computer instructions, e.g., computer code, stored on a persistent storage that when executed by a client or user, causes a processor to provide the functionality of a backup agent (e.g., 106).

In one or more embodiments of the invention, the backup agent (e.g., 106) or other equivalent components of the system determines how to slice an asset that is requested by the backup request. As will be described in more detail below with regards to the method of FIGS. 2 and 3, when a backup is requested for an asset located on the shared storage (e.g., 104) in one or more of its storage devices (e.g., 120A-120N), the backup agent (106) utilizes the file-system metadata (e.g., 122A) located on the shared storage (e.g., 104) to determine where the asset is located, the type of asset, and how large the asset is. In one or more embodiments of the embodiment, if the backup is an incremental backup, this information may instead, or in addition, be obtained from the previous backup's meta data (e.g., 128A).

At the same time, the backup agent (e.g., 106) reads slicing parameters such as the command to perform the backup from a configuration file or other source. The configuration file may be stored on storage associated with the backup agent (e.g., 106), in the storage device (e.g., 120A) of the shared storage (e.g., 104), or it may be provided by a requesting device such as a client device (not shown) when it requests the backup to be performed. The slicing parameters may include such information as a standard size for the slices along with a predetermined tolerance for differences from that standard size, instructions for trimming the metadata/files associated with the asset, such as but not limited to, eliminating files that are not necessary for utilizing the asset (for example "readme files"). The slicing parameters, in accordance with one or more embodiments of the invention may also include a predetermined number of slices to use and other criteria such as the number of slices per stream or container. Other information may be included in the slicing parameters without departing from the invention.

Based on the metadata for the asset and slicing parameters, the backup agent (e.g., 106) may then assign files or portions of files, to individual slices. The backup agent (e.g., 106) assigns the files, folders, or portions thereof to the slices based on the criteria in the slicing parameters. In one or more embodiments of the invention, the files may be assigned in such a way that each slice has an equal size within a predetermined tolerance. This tolerance may be plus or minus a percentage that is specified in the slicing parameters and/or specified by a client, a user, or an administrator at the time that the asset is requested. Some examples of a tolerance are ≤±1%, ±5%, or ±10%. Other percentages and/or ranges may be used without departing from the invention.

In one or more embodiments of the invention, the size of each slice is determined based on the type of asset that will be stored in the slice. As is described in more detail below with regards to the methods of FIGS. 2 and 3, the backup agent (106) or other related component analyzes the metadata from a previous backup to determine the various asset types that are in the backup. Alternatively, where a previous backup does not exist, the asset types may be determined at the time of discovery or when the backup is configured.

Once asset data types are determined, those assets that are related to certain preset asset types (such as, in a non-limiting example, a database) are assigned to slices that have their size increased or decreased, as appropriate, by a predetermine percentage. In one or more embodiments of the invention this increase or decrease, is from a standard slice size and is a predetermined percentage that is greater than any predetermined tolerance. In one or more embodiments of the invention, those assets that are not the preset asset types are assigned to slices that are a standard size which may be, in a non-limiting example, 200 GB.

Once the assets such as files, folders, or portion of them are assigned to their specific slices, the backup agent (e.g., 106) may save the metadata for the files with an indication of which slice they are to be applied. Alternatively, or in addition, a slice list may be produced which maps each asset to a specifically sized slice. The slice list may be saved in the backup storage (110) or in one or more of the storage devices (e.g., 120A) associated with the shared storage (104) and/or the production hosts (e.g., 100, FIG. 1A). Other locations may be used without departing from the invention.

The backup agent (e.g., 106), utilizing network telemetry and the file system metadata (e.g., 122A-122N), may then assign the slices to individual network streams. In accordance with one or more embodiments of the invention, the backup agent (e.g., 106) assigns each asset in the form of slices to a specific stream based on predetermined criteria and current device and network configurations and telemetry. In one or more embodiments this may not be based on the order that the files and/or folders forming the asset are found in the file system and/or file system metadata (e.g., 122A-122N). But rather, based on other criteria to ensure that each of the steams have cost and throughput that are similar to each other within the predetermined threshold or meet certain performance criteria (such as but not limited to transferring slices that have a higher priority or better performance prior to other slices). Once the files and folders associated with an asset are sliced, and placed in streams, the backup agent (e.g., 106) causes the streams to be transmitted by the network (e.g., 108, FIG. 1A) to the backup storage (e.g., 110).

In one or more embodiments of the invention, the backup storage device (e.g., 110) stores each stream in its own backup container (e.g., 126A-126N) without putting the streams, slices, files, and/or folders, back into the original order or associations found in the file systems on the shared storage (e.g., 104). In one or more embodiments of the invention, each container has its own metadata (e.g., 128A) that maintains the mapping between the data (e.g., 130A) located in a stream stored in a container (e.g., 126A-126N) and its original location on the storage devices (e.g., 120A-120N). In one or more embodiments of the invention, alternatively, a single metadata (e.g., 128A) may be used to store the mapping between all the data (e.g., 130A) generated in the backup and stored in multiple containers (e.g., 126A-126N).

In accordance with one or more embodiments of the invention, when a restoration is requested at a later time, the backup agent (e.g., 106) retrieves the metadata (e.g., 128A) and data (e.g., 130A) stored in the containers (e.g., 126A-126N) on the backup storage (e.g., 110). Without reorganizing the data on the backup storage (e.g., 110), the backup agent (106) restores the files and folders of the asset to their original file system on the storage devices (e.g., 120A-120N) of the shared storage (e.g., 104) or the production hosts (e.g., 100, FIG. 1A). The file and folders, in accordance with one or more embodiments of the invention, may alternatively be restored to a new or alternative location on the production hosts (e.g., 100, FIG. 1A) or shared storage (e.g., 104), including on a new production host, or even a new group. Other methods for restoring the backup may be used and the invention is not limited to those described above.

The backup storage (e.g., 110) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data. The backup storage devices may utilize any quantity of hardware storage resources of any number of computing devices for storing data. For example, the backup storage (e.g., 110) may utilize portions of any combination of hard disk drives, solid state disk drives, tape drives, and/or any other physical storage medium of any number of computing devices. The backup storage (e.g., 110) may additionally be part of the storage devices (e.g., 120A) located on the production host (e.g., 102).

Figure 2:
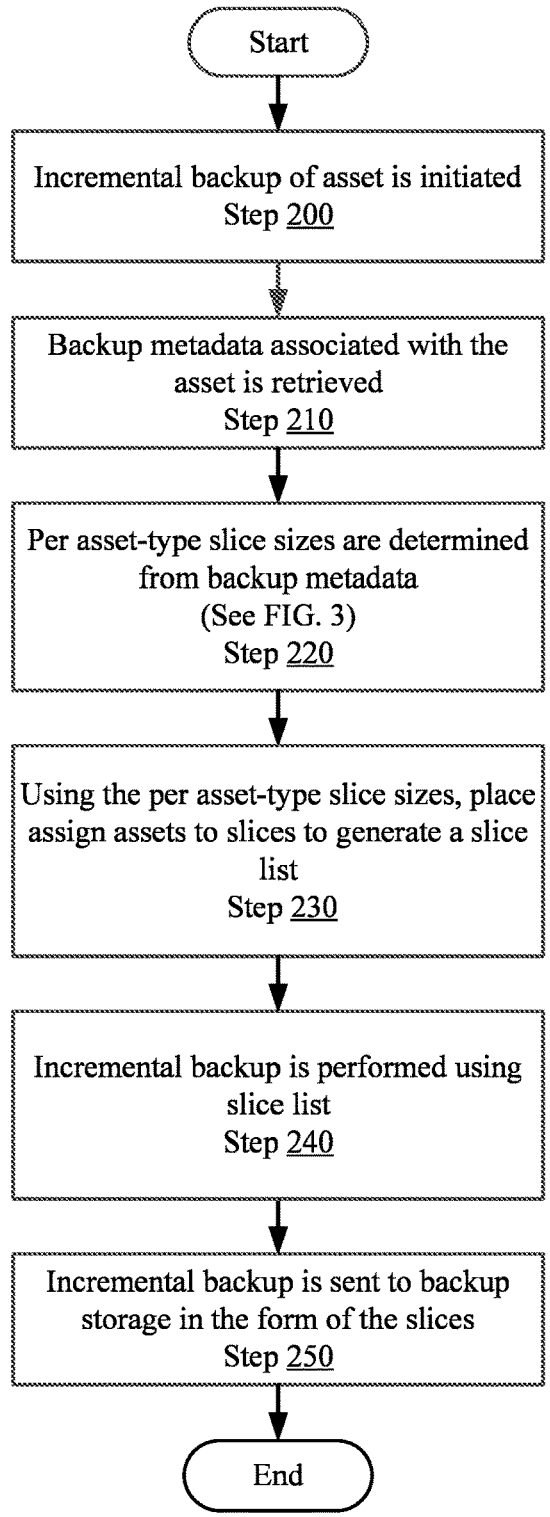
FIG. 2 shows a flowchart of a method of backing up an asset in accordance with one or more embodiments of the invention.

FIG. 2 shows a method of backing up an asset located on the shared storage (e.g., 104, FIG. 1A) and/or one or more production hosts (e.g., 102A-102C, FIG. 1A) in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method of FIG. 2 may be performed by, for example, a backup agent (e.g., 106, FIG. 1B) or an individual production host (e.g., 102A-102N, FIG. 1A). Other components of the system illustrated in FIGS. 1A and 1B may perform all or a portion of the method of FIG. 2 without departing from the invention.

In step 200, the system receives a request for an incremental backup of an asset located on the shared storage and/or a production host. The request may come from a user, an administrator, or an application hosted by one or more of the production hosts (e.g., 102A-102N, FIG. 1A). The request may alternatively be triggered based on preconfigured instructions that indicate how often and/or when a backup agent should perform an incremental backup. The request may include instructions for how to perform the backup (such as, but not limited to, a standard slice size, a predetermined tolerance, preset asset types, how many streams to use, tolerance for differences between each stream in cost and throughput, etc.). The request may also include an indication of a location to store the backup, which may include the backup storage device (e.g., 110, FIG. 1B) or other locations.

The shared storage (e.g., 104, FIG. 1A) and/or the production host may include a plurality of assets either stored on the production host's local storage (e.g., 112A-112N, FIG. 1A) or on the shared storage (e.g., 104, FIG. 1A). The assets may be a file, a plurality of files, as well as folders or other resources that are in general associated with the production host requested by the backup agent (e.g., 106, FIG. 1A). The request may be for all the assets associated with a production host or shared storage or may be for only a subset of the assets (such as, but not limited to, all database and user files). When the request for an asset is received, the backup agent (e.g., 106, FIG. 1A), another component such as a group manager (not shown), or an appropriate production host (e.g., 102A-102N, FIG. 1A) determines the location of each asset utilizing file system metadata (e.g., 122A-122N) as well as the location of any previous backups performed on the asset stored on the shared storage (e.g., 104, FIG. 1A) and/or production host (e.g., 102A-102N, FIG. 1A).

Once the request for the backup of the asset is received, the method proceeds to step 210, where backup metadata that is associated with the asset is retrieved. This metadata may be metadata that was stored with an initial backup of the asset. Alternatively, this metadata may have been produced by a previous incremental backup and may be metadata from the most recent incremental backup or full backup. The metadata may include such information as where each asset is located in the backup containers (e.g., 126A, FIG. 1B), how many slices are used, the type of assets stored in the slices, and other information useful for performing a recovery and/or an incremental backup.

Once this metadata is obtained in step 210, the method proceeds to step 220, where per asset-type slice sizes are determined using the backup metadata. As described in more detail below with regards to the method shown in FIG. 3, the per asset-type slice sizes are determined from analyzing the various types of assets included in the previous backup as listed in the backup metadata associated with the previous backup. Based on the types of assets included as well as predetermined preset asset types, the slice sizes may be changed by a predetermined percentage. In one or more embodiments of the invention this percentage may be specified by a user, administrator, or other party when configuring the backup, alternatively the percentage may be determined based on the performance of the previous backup. With certain asset types being selected to have larger or smaller slice sizes in order to decrease the number of streams and/or connections needed to transfer the assets.

Once the per asset-type slice sizes are determined the method proceeds to step 230, the assets are assigned to slices and a slice list is generated. This slice list details which slice a particular asset is to be assigned to as well as how big the slice should be. Depending on the type of asset each slice may store more than one asset. For example, if the asset were a plurality of small user files (such as image files), multiple files might be added to the same slice, however, if the asset is a large file such as a database file, it is possible the file would have to be divided and assigned to multiple slices. Other configuration of the assets and the slices may be used without departing from the invention.

Assigning the assets to slices and generating a slice list may be performed by the backup agent (e.g., 106, FIG. 1A), or component of the production hosts (e.g., 100, FIG. 1A). The backup agent (e.g., 106, FIG. 1A), or other component such as a slicing specific component (i.e., a slicer) (not shown), uses slicing parameters to determine which slice, as well as the size of the slice, a particular asset may be assigned to. The slicing parameters may include such information as a predetermined standard slice size, a predetermined amount of files that can be added to a standard slice, a predetermined tolerance for exceeding a standard slice size, change in slice sizes (from the predetermined standard slice size) for preset asset types, and instructions for trimming the metadata/files associated with the asset (such as, but not limited to, eliminating files that are not necessary for utilizing the asset, for example readme files). Other information may be included in the slicing parameters without departing from the invention.

In general, the slices that are assigned to specific asset types are the same size within a predetermine tolerance. Some examples of a tolerance are ≤±1%, ±5%, or ±10%, other percentages and/or ranges may be used without departing from the invention. For example, the standard slice size may be 200 GB, however if the predetermined tolerance is 5%, a particular slice may be up to 210 GB or 190 GB to accommodate specific assets of different size. However, if the asset is a preset asset type it may use a slice that exceeds the 210 GB or is smaller than 190 GB as appropriate for the particular asset type as will described in more detail with regards to the method shown in FIG. 3. Different size slices and tolerances may be used for each type of asset and those assets that are members of each type without departing from the invention.

In one or more embodiments of the invention, instead of or in addition to, the slice size may be an indication of how many files a specific slice can store, within a tolerance. Some examples of a tolerance can be ≤±1%, ±10%, or ±30%. For example, the standard slice may include 1 million files; however, if the predetermined tolerance is 5%, a particular slice may include up to 1.05 million files at least 0.95 million files to accommodate specific assets of different size. However, if the asset is a preset asset type it may use a slice that includes more than 1.05 million files or is smaller than 0.95 million files as appropriate for the particular asset type as will described in more detail with regards to the method shown in FIG. 3. Different size slices and tolerances may be used for each type of asset and those assets that are members of each type without departing from the invention.

After the slice list is generated in step 230, the method proceeds to step 240 where an incremental backup is performed using the slice list and sent to the backup storage in step 250 in the form of the slices. The backup agent (e.g., 106, FIG. 1A) causes the slices to be transmitted by the network (e.g., 108, FIG. 1A) to the backup storage device (e.g., 114) in one or more streams. In one or more embodiments of the invention, the backup storage device (e.g., 114) stores each stream in its own backup container (e.g., 126A-126N, FIG. 1B) without putting the streams, slices, files, and/or folders, back into the original order or associations as found in the file systems on the production host (e.g., 102, FIG. 1A). In one or more other embodiments of the invention, the files and/or folders forming the assets are restored to their original order/associations.

In one or more embodiments of the invention, each container has its own metadata (e.g., 128A) that maintains a mapping between the data (e.g., 130A, FIG. 1B) transmitted by the stream stored in the corresponding container of the stream (e.g., 126A-126N, FIG. 1B) and its original location on the storage devices (e.g., 120A-120N, FIG. 1B). In one or more embodiments of the invention, alternatively, a single metadata (e.g., 128A) may be used to store the mapping between all of the data (e.g., 130A, FIG. 1B) generated in the backup in stored in multiple containers (e.g., 126A-126N, FIG. 1B).

Once the assets in the form of slices are stored in the appropriate containers (e.g., 12A-126N, FIG. 1B), the method may end.

Figure 3:
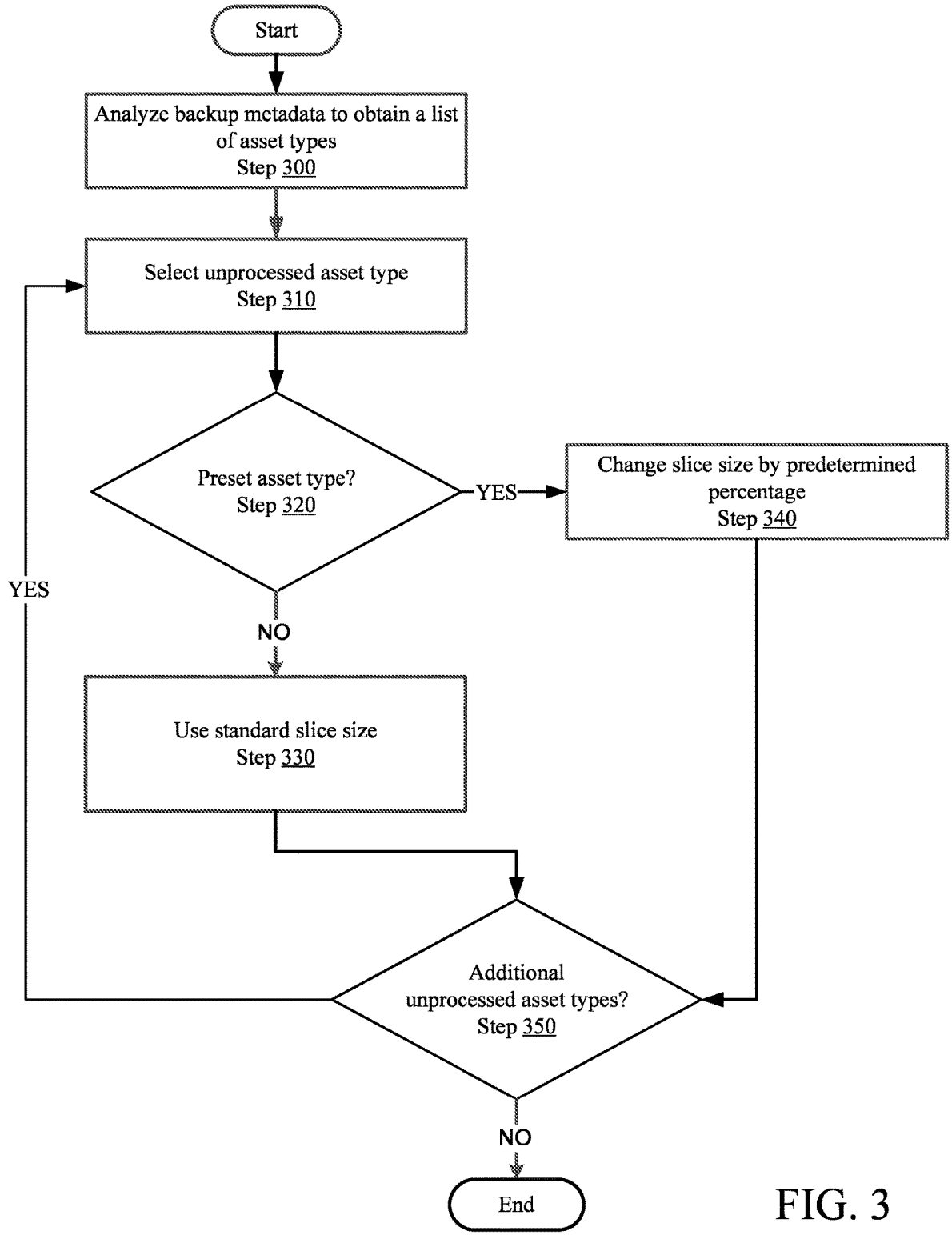
FIG. 3 shows a flowchart of a method of determining slice size in accordance with one or more embodiments of the invention.

FIG. 3 shows a method of determining from backup metadata per asset-type slice sizes in accordance with one or more embodiments of the invention. While the various steps in the method are presented and described sequentially, those skilled in the art will appreciate that some or all the steps may be combined, omitted, executed in different orders, or some or all steps may be executed in a parallel manner without departing from the scope of the invention.

The method of FIG. 3 may be performed by, for example, a backup agent (e.g., 106, FIG. 1B) or an individual production host (e.g., 102A-102N, FIG. 1A). Other components of the system illustrated in FIGS. 1A and 1B may perform all, or a portion of the method of FIG. 3 without departing from the invention.

In step 300, the system receives the metadata from a previous backup and analyzes the metadata to obtain a list of asset types present in the backup. The previous backup may be an initial full backup of the production host or a previous incremental backup of the production host. The metadata may be retrieved after receiving a request for performing an incremental backup as described in step 210 of the method of FIG. 2. Alternatively, the list of asset types could be obtained without analyzing the metadata of a previous backup and obtained by crawling a production host or other source to identify each asset that is to be backed up.

Returning to step 300, the metadata is analyzed to determined what type of assets are present. In one or more embodiments of the invention the production host may include assets in the form of files and folders. Any other form of organizing the data on a production host may be used without departing from the invention. Each of these assets has a different type, such as, but not limited to, database, image file, text files, application related files, virtual disks, medical records, telemetry data, static data, and any other types of data stored or produced by the production host. Each type of asset found in the metadata is identified and recorded in an asset type list.

Prior to step 310, each slice is associated with an asset type is a standard size and/or includes a standard number of files within a predetermine tolerance as described above. In step 310, an unprocessed asset type in the list of asset types is analyzed and in step 320 it is determined if the asset type is of a preset type. The preset types may be determined when the backup is initially set up and/or configured by a user, administrator, or other concerned parties. Alternatively, the preset types may be determined by examining the metadata of the previously performed backup to note asset types that frequently have to be split up into multiple slices and/or make inefficient use of the available capacity of a standard size slice. For example, database type assets are frequently exceptionally large and unable to fit entirely in a single standard size slice. It may then be desirable to include database type assets in the preset asset type. Another asset type that frequently makes inefficient use of the available capacity is a virtual disk which may be smaller (such as when system policies limit the size of a virtual disk) then the standard slice size. Other types of assets may be included in the preset asset type and the invention is not limited to the two listed here.

Once it is determined whether the asset is the preset type, the method proceeds to step 330, if the asset is not a preset asset type. If the asset is not a preset asset type, in step 330, a standard size slice is assigned to the asset type. The standard size slice may be preconfigured based on the configuration of the system, network capacities, and/or user/administrator configuration. The standard size slice in one or more embodiments of the invention may be 200 GB; however, other sizes may be used including 300 GB, 500 GB, 1 GB, 500 MB, 1 TB etc. The standard size slice in one or more embodiments of the invention may be able to store 1 million files; however, other number of files such as 1 thousand etc. may be used in the standard size slice. The standard size slice is not limited by the sizes listed here and the size may range from the smallest file size to the maximum capacity of the network and related components of the system without departing from the invention. The size of the standard size slice may also vary from the standard size by a predetermined tolerance as discussed above in regard to step 230 of the method shown in FIG. 2.

Once it is determined that the asset type is not of a preset asset type and is assigned to a standard slice size in step 330 the method proceeds to step 350. Alternatively, if the asset type is determined to be of a preset asset type in step 330, the method proceeds to step 340. In step 340, the slice size associated with the asset type is changed by a predetermined percentage. This change in size may be a percentage that is greater than the predetermined tolerance. For example, if the predetermined tolerance is 5%, the change in size may be any percentage greater than 5% such as, but not limited to, 10%. The amount of the percentage is determined based on the preset asset type and/or user or administrator input. The change may either be an increase in size (for example, it may be beneficial for a database asset type to have a slice size that is 50% larger than the standard slice size) or the change may be a decrease in size (for example a virtual disk may be, do to system configuration, always less than the slice size and it may be beneficial to have the slice size be 10% smaller than the standard slice size). Alternatively, or in addition the change may be an increase or decrease in the number of files a slice can store. The specific percentage is not limited to those listed in the above examples and may any amount greater than the predetermine tolerance without departing from the invention.

In a non-limiting example, suppose a production host includes the following two preset asset types: a database and a virtual disk. By analyzing the metadata of a previous backup performed on the production host, it is determined that the database assets average size is 300 GB while the virtual disk average size is 150 GB. If a standard slice size is 200 GB, it may be desirable to have the slices for a database type asset to be increased by 50% to a size of 300 GB. Because the virtual disk does not use all of the space in the standard slice, it may be desirable to decrease the size of the slice used for a virtual disk by 25%. Other percentages may be used without departing from the invention.

Returning to the method of FIG. 3, once the slice size is changed by the predetermined percentage in step 340, the method proceeds to step 350. In step 350 the method determines if there are more unprocessed asset types. If there are more, then the next asset type in the list of asset types is selected and the method returns to step 310 and steps 310-350 are repeated until all asset types in the list of asset types have been processed. Once all of the asset types have been processed the method may end.

Additionally, as discussed above, embodiments of the invention may be implemented using computing devices. FIG. 4 shows a diagram of a computing device in accordance with one or more embodiments of the invention. The computing device (400) may include one or more computer processors (410), non-persistent storage (430) (e.g., volatile memory, such as random access memory (RAM), cache memory), persistent storage (440) (e.g., a hard disk, an optical drive such as a compact disk (CD) drive or digital versatile disk (DVD) drive, a flash memory, etc.), a communication interface (420) (e.g., Bluetooth interface, infrared interface, network interface, optical interface, etc.), input devices (460), output devices (450), and numerous other elements (not shown) and functionalities. Each of these components is described below.

In one embodiment of the invention, the computer processor(s) (410) may be an integrated circuit for processing instructions. For example, the computer processor(s) may be one or more cores or micro-cores of a processor. The computing device (400) may also include one or more input devices (460), such as a touchscreen, keyboard, mouse, microphone, touchpad, electronic pen, or any other type of input device. Further, the communication interface (420) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (450), such as a screen (e.g., a liquid crystal display (LCD), a plasma display, touchscreen, cathode ray tube (CRT), monitor, projector, or other display device), a printer, external storage, or any other output device. One or more of the output devices may be the same or different from the input device(s). The input and output device(s) may be locally or remotely connected to the computer processor(s) (410), non-persistent storage (430), and persistent storage (440). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices. In one or more embodiments, assets such as files and folders that are to be backed up are placed in appropriate network slices. The assets are assigned to appropriately sized slices depending on the type of asset (database, virtual disk, etc.) in order to efficiently perform the backup. The backup is performed, and assets are stored in backup storage. The one or more embodiments of the invention utilize the backup metadata of a previous backup to determine the appropriate sizes for the slices assigned to each type of asset. This results in an efficient use of network resources, while minimizing the amount of work the hosts and/or clients must perform in order to perform a backup and/or restoration of an asset.

The problems discussed above should be understood as being examples of problems solved by embodiments of the invention disclosed herein, and the invention should not be limited to solving the same/similar problems. The disclosed invention is applicable to address a range of problems beyond those discussed herein.

While the invention has been described with respect to a limited number of embodiments, those skilled in the art, having the benefit of this disclosure, will appreciate that other embodiments may be devised which do not depart from the scope of the technology as disclosed herein. Accordingly, the scope of the invention should be limited only by the attached claims.

What is claimed is:

1. A method for performing an incremental backup of selected assets, the method comprising:
   receiving a request to perform the incremental backup of the selected assets, wherein the selected assets are stored in a file-system associated with a production host;
   retrieving, in response to the request, backup metadata from a previous backup of the selected assets;
   determining, based on the backup metadata, asset types of the selected assets;
   generating a list of asset types for the selected assets based on the determined asset types;
   determining, for each determined asset type in the list of asset types, if the determined asset type is a preset type, wherein a predetermined percentage is associated with the preset type;
   placing, based on the determined asset type, each asset in at least one slice to generate a slice list, wherein all slices are, within a predetermined tolerance, a standard size, wherein if the asset is the preset type, the size of the at least one slice is changed by the predetermined percentage associated with the preset type, wherein the predetermined percentage is greater than the predetermined tolerance; and
   performing the incremental backup of the selected assets using the slice list, wherein performing the incremental backup comprises:
   generating a backup copy of the selected assets;
   causing to store the backup copy in a backup storage device; and
   causing to store the separate file in the backup storage device.

2. The method of claim 1, wherein the preset type is one of a database or a virtual hard disk.

3. The method of claim 1, wherein the previous backup of the selected assets host is an initial full backup of the file-system associated with the production host.

4. The method of claim 1, wherein the previous backup of the production host is a previous incremental backup of the selected assets.

5. The method of claim 1, wherein the size of the at least one slice is specified using a number of files that can be stored in the at least one slice.

6. The method of claim 1, wherein the size of the at least one slice is related to the number of bytes that can be stored in the at least one slice.

7. A non-transitory computer readable medium comprising computer readable program code, which when executed by a computer processor, enables the computer processor to perform a method for performing an incremental backup of selected assets, the method comprising:
   receiving a request to perform the incremental backup of the selected assets, wherein the selected assets are stored in a file-system associated with a production host;
   retrieving, in response to the request, backup metadata from a previous backup of the selected assets;
   determining, based on the backup metadata, asset types of the selected assets;
   generating a list of asset types for the selected assets based on the determined asset types;
   determining, for each determined asset type in the list of asset types, if the determined asset type is a preset type, wherein a predetermined percentage is associated with the preset type;
   placing, based on the determined asset type, each asset in at least one slice to generate a slice list, wherein all slices are, within a predetermined tolerance, a standard size, wherein if the asset is the preset type, the size of the at least one slice is changed by the predetermined percentage associated with the preset type, wherein the predetermined percentage is greater than the predetermined tolerance; and
   performing the incremental backup of the selected assets using the slice list, wherein performing the incremental backup comprises:
   generating a backup copy of the selected assets;
   causing to store the backup copy in a backup storage device; and
   causing to store the separate file in the backup storage device.

8. The non-transitory computer readable medium of claim 7, wherein the preset type is one of a database or a virtual hard disk.

9. The non-transitory computer readable medium of claim 7, wherein the previous backup of the production host is an initial full backup of the file-system associated with the production host.

10. The non-transitory computer readable medium of claim 7, wherein the previous backup of the production host is a previous incremental backup of the selected assets.

11. A system comprising:
    at least one production host;
    at least one processor; and a memory comprising instructions, which when executed by the at least one processor, performing an incremental backup of the at least one production host, the method comprising:

receiving a request to perform the incremental backup of the at least one production host, retrieving, in response to the request, backup metadata from a previous backup of the at least one production host;

determining, based on the backup metadata, asset types of assets stored in a file-system associated with the at least one production host;

generating a list of asset types for the assets stored in the file-system based on the determined asset types;

determining, for each determined asset type in the list of asset types, if the determined asset type is a preset type, wherein a predetermined percentage is associated with the preset type;

placing, based on the determined asset type, each asset in at least one slice to generate a slice list, wherein all slices are, within a predetermined tolerance, a standard size, wherein if the asset is the preset type, the size of the at least one slice is changed by the predetermined percentage associated with the preset type, wherein the predetermined percentage is greater than the predetermined tolerance; and performing the incremental backup of the at least one production host using the slice list, wherein performing the incremental backup comprises:

generating a backup copy of the selected assets;

causing to store the backup copy in a backup storage device; and causing to store the separate file in the backup storage device.

* * * * *